US012381199B2

(12) United States Patent
Chen et al.

(10) Patent No.: US 12,381,199 B2
(45) Date of Patent: Aug. 5, 2025

(54) DEVICE FOR SUPPLEMENTING ELECTRODE PLATE WITH LITHIUM AND METHOD FOR SUPPLEMENTING ELECTRODE PLATE WITH LITHIUM

(71) Applicant: CONTEMPORARY AMPEREX TECHNOLOGY (HONG KONG) LIMITED, Hong Kong (CN)

(72) Inventors: Shitong Chen, Fujian (CN); Bin Xie, Fujian (CN); Xinlu Fei, Fujian (CN); Yongqiang Xu, Fujian (CN); Yuzhe Zhang, Fujian (CN); Lin Ma, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 326 days.

(21) Appl. No.: 17/523,463

(22) Filed: Nov. 10, 2021

(65) Prior Publication Data

US 2022/0069275 A1 Mar. 3, 2022

Related U.S. Application Data

(63) Continuation of application No. PCT/CN2020/127372, filed on Nov. 7, 2020.

(30) Foreign Application Priority Data

Nov. 21, 2019 (CN) .......................... 201911146508.1

(51) Int. Cl.
*H01M 4/04* (2006.01)
*H01M 4/134* (2010.01)
*H01M 4/1395* (2010.01)

(52) U.S. Cl.
CPC ....... *H01M 4/0435* (2013.01); *H01M 4/0404* (2013.01); *H01M 4/134* (2013.01); *H01M 4/1395* (2013.01)

(58) Field of Classification Search
CPC .... H01M 4/04; H01M 4/0404; H01M 4/0435; H01M 4/134; H01M 4/139; H01M 4/1395
See application file for complete search history.

(56) References Cited

U.S. PATENT DOCUMENTS 7,513,136 B2 * 4/2009 Laliberte ............ H01M 4/0404
72/11.8

FOREIGN PATENT DOCUMENTS

CN     101923312 A     12/2010
CN     104993094 A * 10/2015 ............ H01M 4/043
(Continued)

OTHER PUBLICATIONS

International Search Report issued on February 9, 2021in corresponding International Application No. PCT/CN2020/1127372; 3 pages.

(Continued)

*Primary Examiner* — Carson Gross
(74) *Attorney, Agent, or Firm* — K&L Gates LLP

(57) ABSTRACT

A device for supplementing an electrode plate with lithium and a method for supplementing an electrode plate with lithium. The device for supplementing an electrode plate with lithium includes a first lithium strip unwinding mechanism, an electrode plate unwinding mechanism, a roller pressing mechanism, a first traction mechanism, an electrode plate winding mechanism, and a first coating mechanism. The first lithium strip unwinding mechanism is configured to dispose a lithium strip, and the electrode plate unwinding mechanism is configured to dispose an electrode plate. The (Continued)

roller pressing mechanism includes a first calendering roller, a first laminating roller, and a second laminating roller. In a traveling direction of the lithium strip, the first coating mechanism precedes the roller pressing mechanism, and the first coating mechanism is configured to apply a coating layer on a surface of the lithium strip.

19 Claims, 5 Drawing Sheets

(56) References Cited

FOREIGN PATENT DOCUMENTS

| | | | | | |
|---|---|---|---|---|---|
| CN | 105489846 | A | | 4/2016 | |
| CN | 106025367 | A | | 10/2016 | |
| CN | 206317512 | U | | 7/2017 | |
| CN | 206878096 | U | | 1/2018 | |
| CN | 206878098 | U | | 1/2018 | |
| CN | 207558931 | U | * | 6/2018 | |
| CN | 108899468 | A | * | 11/2018 | ........ H01M 10/0525 |
| CN | 109256526 | A | | 1/2019 | |
| CN | 109360943 | A | | 2/2019 | |
| CN | 110010844 | A | | 7/2019 | |
| CN | 209401737 | U | | 9/2019 | |
| CN | 210805916 | U | | 6/2020 | |
| JP | H09129220 | A | | 5/1997 | |
| JP | H09274910 | A | | 10/1997 | |
| JP | H10228900 | A | | 8/1998 | |
| JP | H10233209 | A | | 9/1998 | |
| JP | 2017094552 | A | | 6/2017 | |
| JP | 2017126549 | A | * | 7/2017 | ........ H01M 10/0525 |
| JP | 2018142528 | A | | 9/2018 | |
| JP | 2018147836 | A | | 9/2018 | |
| JP | 2018190692 | A | | 11/2018 | |
| KR | 20150045231 | A | * | 4/2015 | |

OTHER PUBLICATIONS

Written Opinion received in the corresponding international application PCT/CN2020/127372, mailed Feb. 9, 2021.
First Office Action received in the corresponding Japanese application 2022-527950, mailed Jun. 14, 2023.
Notice of Grant of Utility Model Patent Rights received in the corresponding Chinese application 201922021428.5, mailed Apr. 14, 2020.
Extended Search Report issued Jun. 14, 2022 in European Patent Application No. 20889495.6-1108/3933976 PCT/CN2020127372; 6 pages.
Request for the Submission of an Opinion received in the corresponding Korean application 10-2022-7017128, mailed Mar. 25, 2024.
First Office Action received in the corresponding Chinese application 201911146508.1, mailed Apr. 2, 2024.

* cited by examiner

DEVICE FOR SUPPLEMENTING ELECTRODE PLATE WITH LITHIUM AND METHOD FOR SUPPLEMENTING ELECTRODE PLATE WITH LITHIUM

CROSS-REFERENCE TO RELATED APPLICATIONS

This application is a continuation of International Application No. PCT/CN2020/127372, filed on Nov. 7, 2020, which claims priority to Chinese Patent Application No. 201911146508.1, filed on Nov. 21, 2019. The disclosures of the aforementioned applications are hereby incorporated by reference in their entireties.

TECHNICAL FIELD

This application relates to the field of battery production, and in particular, to a device for supplementing an electrode plate with lithium and a method for supplementing an electrode plate with lithium.

BACKGROUND

Lithium-ion batteries are widely used in the field of consumer electronics and electric vehicles due to their advantages such as high energy density, long service life, and pollution free. However, in a lithium-ion battery, a solid electrolyte interphase film (SEI film) is formed in the first charge and discharge process, and the solid electrolyte interphase film consumes a part of lithium, causing loss of lithium. This irreversible initial capacity loss directly leads to capacity loss of the lithium-ion battery.

SUMMARY

In view of the problems in the background, this application is intended to provide a device for supplementing an electrode plate with lithium and a method for supplementing an electrode plate with lithium, to realize electrode plate lithiation, simplify a lithiation process, and save lithium strips.

To achieve the above purpose, this application provides a device for supplementing an electrode plate with lithium. The device for supplementing an electrode plate with lithium includes a first lithium strip unwinding mechanism, an electrode plate unwinding mechanism, a roller pressing mechanism, a first traction mechanism, an electrode plate winding mechanism, and a first coating mechanism. The first lithium strip unwinding mechanism is configured to dispose a lithium strip, and the electrode plate unwinding mechanism is configured to dispose an electrode plate. The roller pressing mechanism includes a first calendering roller, a first laminating roller, and a second laminating roller. The first traction mechanism is configured to draw the lithium strip into between the first calendering roller and the first laminating roller, and the electrode plate winding mechanism is configured to wind up the electrode plate and draw the electrode plate to pass through between the first laminating roller and the second laminating roller. In a traveling direction of the lithium strip, the first coating mechanism precedes the roller pressing mechanism, and the first coating mechanism is configured to apply a coating layer on a surface of the lithium strip.

This application can realize electrode plate lithiation, and integrate a calendering process and a laminating process of the lithium strip, thereby simplifying a lithiation process and reducing occupied space and production costs. Applying the coating layer on the surface of the lithium strip ensures that the lithium strip can be smoothly transferred to a surface of the electrode plate. The first traction mechanism can initially draw the lithium strip to travel, so that the first coating mechanism can apply the coating layer on the surface of the lithium strip to prevent the lithium strip from adhering to the calendering roller and the laminating roller. Furthermore, the first traction mechanism can draw the lithium strip coated with the coating layer into between the first calendering roller and the first laminating roller, avoiding drawing the lithium strip all the way, and reducing waste of the lithium strip.

In some embodiments, the first traction mechanism includes a traction roller and a traction belt, one end of the traction belt is connected to the traction roller, and the other end of the traction belt is connected to the lithium strip. In the traveling direction of the lithium strip, the traction roller is preceded by the first calendering roller.

In the device for supplementing an electrode plate with lithium of this application, the traction belt is connected to the traction roller, and the other end of the traction belt is connected to the lithium strip, so that the first coating mechanism can also apply a coating layer at an end of the lithium strip L close to the traction roller, to reduce waste of the lithium strip L caused by the lithium strip L not coated with a coating layer.

In some embodiments, the device for supplementing an electrode plate with lithium further includes a lubricating mechanism and a cleaning mechanism. The lubricating mechanism and the cleaning mechanism are arranged on an outer peripheral side of the first laminating roller, and the lubricating mechanism and the cleaning mechanism are arranged in a rotation direction of the first laminating roller. The lubricating mechanism is configured to apply a lubricating agent on a roller surface of the first laminating roller, and the cleaning mechanism is configured to clean the roller surface of the first laminating roller.

In the device for supplementing an electrode plate with lithium of this application, the cleaning mechanism cleans the roller surface of the first laminating roller, so that the electrode plate can be smoothly intercalated with lithium; and the lubricating mechanism applies the lubricating agent on the roller surface of the first laminating roller, to reduce difficulty of scraping off lithium crumbs and release agent by a scraper and avoid scratching the roller surface of the first laminating roller. Under high-velocity production, the lubricating agent can also avoid safety hazards such as smoke and fire caused by dry friction between the scraper and residual lithium on the surface of the first laminating roller.

In some embodiments, the lubricating mechanism includes two coating heads, and the two coating heads are spaced apart in an axial direction of the first laminating roller.

In the device for supplementing an electrode plate with lithium of this application, the two coating heads are configured to apply the lubricating agent on the surface of the first laminating roller, and coating zones of the two coating heads correspond to a width of the lithium strip L.

In some embodiments, the lubricating mechanism further includes a guide member, and the two coating heads are slidably arranged on the guide member in a direction parallel to the axial direction of the first laminating roller.

In the device for supplementing an electrode plate with lithium of this application, the two coating heads are slidably arranged on the guide member in the direction parallel to the axial direction of the first laminating roller, enabling the lubricating mechanism to adapt to the lithium strips L of different specifications.

In some embodiments, a roller diameter of the first calendering roller is less than a roller diameter of the first laminating roller.

In the device for supplementing an electrode plate with lithium of this application, the roller diameter of the first calendering roller is less than the roller diameter of the first laminating roller, to realize different-diameter rolling by using large and small roller diameters jointly. Compared with equal-diameter rolling, the different-diameter rolling can reduce a rolling pressure for the lithium strip L, increase a contact area between the first laminating roller and the lithium strip L, and improve a gripping effect of the lithium strip L and the first calendering roller and a gripping effect of the lithium strip L and the first laminating roller, so that the lithium strip L is more easily adhered to the roller surface of the first laminating roller.

In some embodiments, a ratio of the roller diameter of the first calendering roller to the roller diameter of the first laminating roller is 0.5 to 0.99.

In the device for supplementing an electrode plate with lithium of this application, the ratio of the roller diameter of the first calendering roller to the roller diameter of the first laminating roller is 0.5 to 0.99, allowing the lithium strip L to be more easily adhered to the roller surface of the first laminating roller.

In some embodiments, the rolling mechanism further includes a first backup roller, where the first backup roller is disposed opposite the first calendering roller and is located on a side of the first calendering roller farther away from the first laminating roller, and a roller diameter of the first backup roller is greater than that of the first calendering roller.

In the device for supplementing an electrode plate with lithium of this application, the first backup roller is disposed opposite the first calendering roller and is located on the side of the first calendering roller farther away from the first laminating roller, and the roller diameter of the first backup roller is greater than that of the first calendering roller, which can reduce deformation of the first calendering roller during long-term use, improve thickness uniformity during the calendering for the lithium strip L, and prolong service life of the device.

In some embodiments, two first coating mechanisms are provided, and apply a coating layer on two surfaces of the lithium strip, respectively, the two first coating mechanisms each accommodate a release agent, and surfaces of the release agents in the two first coating mechanisms have different roughness.

In the device for supplementing an electrode plate with lithium of this application, the two first coating mechanisms apply the release agents on the two surfaces of the lithium strip L, so that the coating layer is formed on each of the two surfaces of the lithium strip L. The surfaces of the release agents in the two first coating mechanisms have different roughness, thereby transferring the lithium strip L to the electrode plate through the different roughness.

In some embodiments, the device for supplementing an electrode plate with lithium further includes a second lithium strip unwinding mechanism, a second traction mechanism, and a second coating mechanism. The second lithium strip unwinding mechanism is configured to dispose a lithium strip. The roller pressing mechanism further includes a second calendering roller, where the second calendering roller is disposed opposite the second laminating roller. The second traction mechanism is configured to draw the lithium strip provided by the second lithium strip unwinding mechanism into between the second calendering roller and the second laminating roller. In a traveling direction of the lithium strip provided by the second lithium strip unwinding mechanism, the second coating mechanism precedes the roller pressing mechanism, and the second coating mechanism is configured to apply a coating layer on a surface of the lithium strip provided by the second lithium strip unwinding mechanism.

The device for supplementing an electrode plate with lithium of this application can realize lithiation on both sides of the electrode plate.

In some embodiments, a roller diameter of the second calendering roller is less than a roller diameter of the second laminating roller.

In the device for supplementing an electrode plate with lithium of this application, the roller diameter of the second calendering roller is less than the roller diameter of the second laminating roller, to realize different-diameter rolling by using large and small roller diameters jointly. Compared with equal-diameter rolling, the different-diameter rolling can reduce a rolling pressure for the lithium strip L, increase a contact area between the second laminating roller and the lithium strip L, and improve a gripping effect of the lithium strip L and the second calendering roller and a gripping effect of the lithium strip L and the second laminating roller, so that the lithium strip L is more easily adhered to the roller surface of the second laminating roller.

In some embodiments, the device for supplementing an electrode plate with lithium further includes at least one group of pre-pressing rollers, each group of pre-pressing rollers includes two pre-pressing rollers; in the traveling direction of the lithium strip, the two pre-pressing rollers in the at least one group of pre-pressing rollers are located outside the two surfaces of the lithium strip, and the two pre-pressing rollers in the at least one group of pre-pressing rollers precede the first coating mechanism.

In the device for supplementing an electrode plate with lithium of this application, the two pre-pressing rollers in each group of pre-pressing rollers can pre-calender the corresponding lithium strip to improve thickness uniformity of the lithium strip, thereby significantly improving an effect of applying the release agent on the surfaces of the lithium strip, avoiding scratching the lithium strip by the coating heads of the first coating mechanism, and addressing the requirement for high thickness uniformity of the lithium strip in a coating process. The thickness uniformity of the lithium strip is associated with manufacturing costs, and therefore lowering the requirement for the thickness uniformity of the lithium strip can reduce incoming material costs of the lithium strip.

In some embodiments, the device for supplementing an electrode plate with lithium includes two groups of pre-pressing rollers; and in the traveling direction of the lithium strip, two pre-pressing rollers in each group of pre-pressing rollers are located outside two surfaces corresponding to one lithium strip, and two pre-pressing rollers in one group of pre-pressing rollers precede the first coating mechanism, and two pre-pressing rollers in the other group of pre-pressing rollers precede the second coating mechanism.

In the device for supplementing an electrode plate with lithium of this application, each of the two groups of pre-pressing rollers can pre-calender the corresponding lithium strip, to improve the thickness uniformity of the lithium strip.

To achieve the above purpose, this application further provides a method for supplementing an electrode plate with lithium. The method for supplementing an electrode plate with lithium includes: disposing a lithium strip to a first lithium strip unwinding mechanism, and disposing an electrode plate to an electrode plate unwinding mechanism; connecting an end of the lithium strip to a first traction mechanism, where the first traction mechanism draws the lithium strip to travel and pass through a first coating mechanism, the first coating mechanism applies a coating layer on a surface of the lithium strip; drawing the lithium strip coated with the coating layer into between a first calendering roller and a first laminating roller under the traction by the first traction mechanism, where the first calendering roller and the first laminating roller rotate and thin the lithium strip, and the lithium strip is adhered to a roller surface of the first laminating roller and is separated from the first traction mechanism; drawing the electrode plate to pass through between the first laminating roller and the second laminating roller and connect to an electrode plate winding mechanism, where the first laminating roller and the second laminating roller roll the electrode plate and the lithium strip on the roller surface of the first laminating roller, to laminate the lithium strip to the surface of the electrode plate.

In the method for supplementing an electrode plate with lithium of this application, the calendering process and the laminating process of the lithium strip L are integrated, thereby simplifying the lithiation process and reducing the occupied space and production costs. The first coating mechanism can apply the coating layer on the surface of the lithium strip L to lower difficulty of separating the lithium strip L from the first calendering roller and difficulty of separating the lithium strip L from the first laminating roller, ensuring that the lithium strip L can be smoothly transferred to the surface of the electrode plate P.

In some embodiments, in the method for supplementing an electrode plate with lithium, a linear velocity of the first calendering roller is lower than a linear velocity of the first laminating roller.

In the method for supplementing an electrode plate with lithium of this application, the linear velocity of the first calendering roller is lower than the linear velocity of the first laminating roller, so that different-velocity rolling can be implemented, to decrease a rolling pressure applied to the lithium strip L, reduce energy consumption, lower payloads of the device, and prolong service life of the device.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following description show merely some embodiments of this application, and a person of ordinary skill in the art may still derive other drawings from the accompanying drawings without creative efforts.

Figure 1:
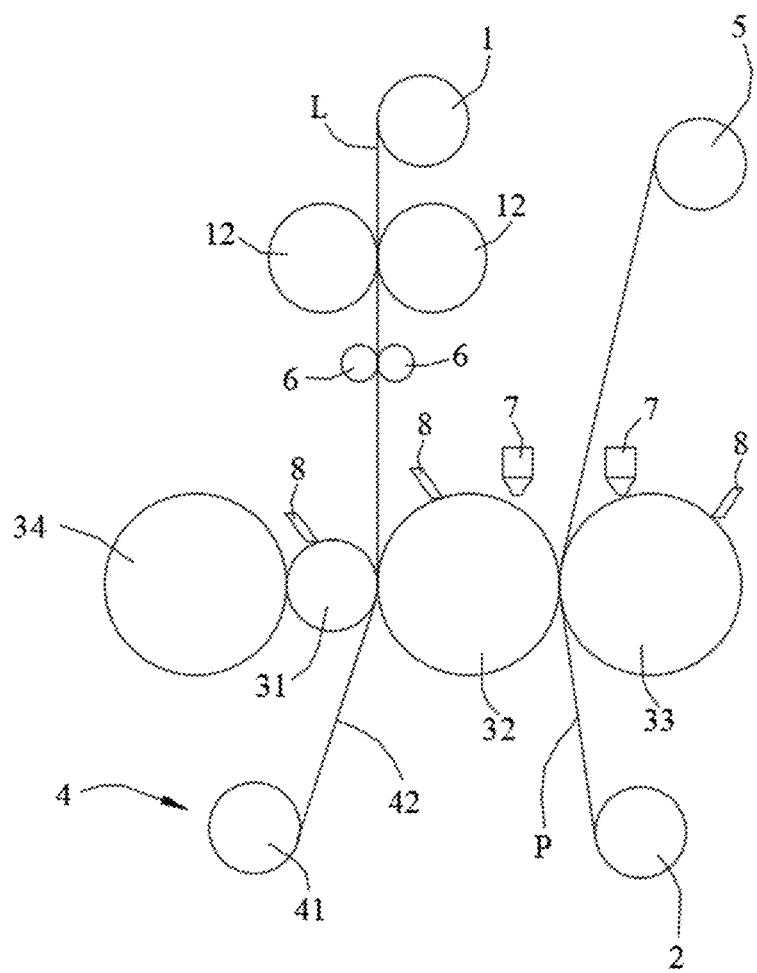
FIG. 1 is a schematic diagram of an embodiment of a device for supplementing an electrode plate with lithium.

In the accompanying drawings, the figures are not drawn to scale.

DETAILED DESCRIPTION OF THE EMBODIMENTS

The following further describes the embodiments of this application in detail with reference to the accompanying drawings and implementations. The detailed description and accompanying drawings of the following embodiments are used to exemplarily illustrate the principle of this application, but cannot be intended to limit the scope of this application, that is, this application is not limited to the described embodiments.

In the descriptions of this application, it should be understood that, unless otherwise specified, "a plurality of" means more than two; orientations or position relationships indicated by the terms "up", "down", "left", "right", "inside", "outside", and the like are merely intended to simplify description of this application for a purpose of easy description, rather than indicating or implying that an apparatus or a part must have a particular direction or must be constructed and operated in a particular orientation. Therefore, this shall not be construed as any limitation on this application. In addition, the terms "first", "second", "third", and the like are merely intended for a purpose of description, and shall not be understood as an indication or implication of relative importance. "Vertical" is not strictly vertical, but within the allowable range of error. "Parallel" is not strictly parallel, but within the allowable range of error.

The orientation terms appearing in the following description are all directions shown in the figures, and do not limit the specific structure of the application. In the descriptions of this application, it should also be noted that, unless otherwise specified and defined explicitly, the terms "mounted", "interconnected" and "connected" are to be interpreted broadly, for example, may be fixedly connected, or detachably connected, or integrally connected, may be directly connected, or indirectly connected through an intermediate medium. A person of ordinary skill in the art can understand specific meanings of these terms in this application based on specific situations.

To make the objectives, technical solutions, and advantages of this application more comprehensible, the following describes this application in detail with reference to embodiments and accompanying drawings. It should be understood that the specific embodiments described herein are merely used to explain this application but are not intended to limit this application.

In the descriptions of this application, unless otherwise specified and defined explicitly, the terms "first" and "second" are merely intended for a purpose of description, and should not be understood as any indication or implication of relative importance; the term "plurality of" indicates two or more (including two); and unless otherwise specified and defined explicitly, the term "connection" should be understood in its general senses. For example, the "connection" may be a fixed connection, a detachable connection, an integrated connection, or an electrical connection, or a signal connection; or may be a direct connection, or an indirect connection through an intermediate medium. A person of ordinary skill in the art can understand specific meanings of these terms in this application based on specific situations.

In the descriptions of the specification, it should be understood that the directional terms such as "up" and "down" described in the embodiments of this application are described from angles shown in the accompanying drawings, and should not be understood as a limitation on the embodiments of this application. This application is hereinafter further described in detail with reference to specific embodiments and accompanying drawings.

The device for supplementing an electrode plate with lithium of this application can be used for lithiation on an electrode plate P to increase capacity and prolong cycle life of a lithium-ion battery. A lithiation process of the electrode plate mainly includes a rolling process and a laminating process. The calendering process is to thin a lithium strip to form a lithium film, and the laminating process is to laminate the lithium film to a surface of the electrode plate P by rolling.

The electrode plate P includes a current collector and an active material layer provided on a surface of the current collector. The current collector may be a metal foil, and the active material layer may include graphite or silicon.

Figure 2:
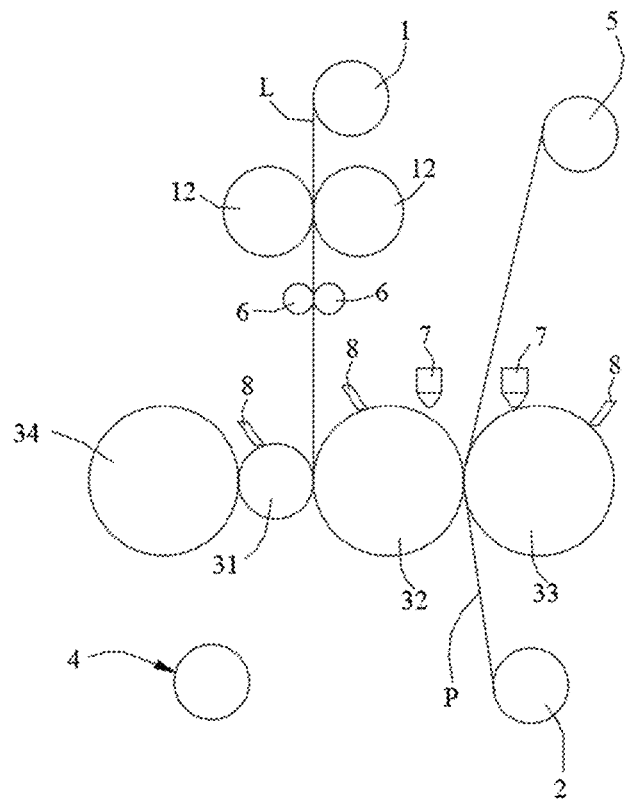
FIG. 2 is another schematic diagram of the device for supplementing an electrode plate with lithium in FIG. 1.

Referring to FIG. 1 and FIG. 2, a device for supplementing an electrode plate with lithium of this application includes a first lithium strip unwinding mechanism 1, an electrode plate unwinding mechanism 2, a roller pressing mechanism 3, a first traction mechanism 4, an electrode plate winding mechanism 5, and a first coating mechanism 6.

The first lithium strip unwinding mechanism 1 is configured to dispose a lithium strip L. The first lithium strip unwinding mechanism 1 includes a lithium strip unwinding roller, and the lithium strip L can be connected to the lithium strip unwinding roller through winding.

The electrode plate unwinding mechanism 2 is configured to dispose an electrode plate P. The electrode plate unwinding mechanism 2 includes an electrode plate unwinding roller, and the electrode plate P can be connected to the electrode plate unwinding roller through winding.

The electrode plate winding mechanism 5 is configured to wind up the electrode plate P and draw the electrode plate P. The electrode plate winding mechanism 5 includes an electrode plate winding roller, and the electrode plate winding roller is an active roller. When lithiation is required, a free end of the electrode plate P may be connected to the electrode plate winding roller, and the electrode plate winding roller rotates to drive the electrode plate P to travel.

The roller pressing mechanism 3 includes a first calendering roller 31, a first laminating roller 32, and a second laminating roller 33. The first calendering roller 31, the first laminating roller 32, and the second laminating roller 33 are all plain-barreled rollers. The first calendering roller 31, the first laminating roller 32, and the second laminating roller 33 may be arranged in order in a horizontal direction; certainly, the first calendering roller 31, the first laminating roller 32, and the second laminating roller 33 may alternatively be arranged in a vertical direction or in a triangular shape as required. A roller gap between the first calendering roller 31 and the first laminating roller 32 may be adjusted as required, and a roller gap between the first laminating roller 32 and the second laminating roller 33 may be adjusted as required.

The first calendering roller 31 and the first laminating roller 32 may be configured to calender the lithium strip L. When lithiation is required, the lithium strip L may be drawn into between the first calendering roller 31 and the first laminating roller 32. A rolling pressure between the first calendering roller 31 and the first laminating roller 32 thins the lithium strip L.

The first traction mechanism 4 is configured to draw the lithium strip L into between the first calendering roller 31 and the first laminating roller 32. The electrode plate winding mechanism 5 can draw the electrode plate P to pass through between the first laminating roller 32 and the second laminating roller 33.

In a traveling direction of the lithium strip L, the first coating mechanism 6 precedes the roller pressing mechanism 3, and the first coating mechanism 6 is configured to apply a coating layer on a surface of the lithium strip L. With the coating layer provided, roughness of two surfaces of the lithium strip L can be changed. When the lithium strip L is rolled by the first calendering roller 31 and the first laminating roller 32, the coating layer can reduce adhesive strength between the lithium strip L and the first calendering roller 31 and adhesive strength between the lithium strip L and the first laminating roller 32, so that the thinned lithium strip L can adhere to a surface of the first laminating roller 32 with relatively low adhesive strength, which facilitates separation of the lithium strip L from the first calendering roller 31 and from the first laminating roller 32.

The first traction mechanism 4 includes a traction roller 41 and a traction belt 42, where the traction belt 42 is connected to the traction roller 41. In the traveling direction of the lithium strip L, the traction roller 41 is preceded by the first calendering roller 31. The traction roller 41 is an active roller. When the lithium strip L needs to be drawn to travel, the traction belt 42 may be connected to the lithium strip L, and the traction roller 41 then rotates to drive the lithium strip L to travel, so that the first coating mechanism 6 can also apply a coating layer at an end of the lithium strip L closer to the traction roller 41, to reduce waste of the lithium strip L caused by the lithium strip L not coated with a coating layer.

The following briefly describes the lithiation process of The device for supplementing an electrode plate with lithium in some embodiments of this application.

When the electrode plate P needs to be intercalated with lithium, a roll material of the lithium strip L is disposed into the first lithium strip unwinding mechanism 1, the traction belt 42 is driven to pass through between the first calendering roller 31 and the first laminating roller 32, and the traction belt 42 is then connected to an end of the lithium strip L.

After a roll material of the electrode plate P is disposed into the electrode plate unwinding mechanism 2, the electrode plate P is driven to pass through between the first laminating roller 32 and the second laminating roller 33, and an end of the electrode plate P is connected to the electrode plate winding mechanism 5. An electrode plate winding roller of the electrode plate winding mechanism 5 rotates and drives the electrode plate P to travel.

The traction roller 41 rotates and drives the lithium strip L through the traction belt 42 to travel. When the lithium strip L passes through the first coating mechanism 6, the first coating mechanism 6 applies a coating layer on a surface of the lithium strip L. The lithium strip L coated with the coating layer is drawn by the first traction mechanism 4 into between the first calendering roller 31 and the first laminating roller 32. A roll gap between the first calendering roller 31 and the first laminating roller 32 is less than a thickness of the lithium strip L, and therefore the first calendering roller 31 and the first laminating roller 32 can thin the lithium strip L. Under the action of the roller pressure, the two surfaces of the lithium strip L are respectively adhered to the first calendering roller 31 and the first laminating roller 32.

As the first calendering roller 31 and the first laminating roller 32 rotate, the lithium strip L is separated from the first calendering roller 31 and adhered to a roller surface of the first laminating roller 32. At the same time, the thinned lithium strip L is separated from the traction belt 42.

Figure 3:
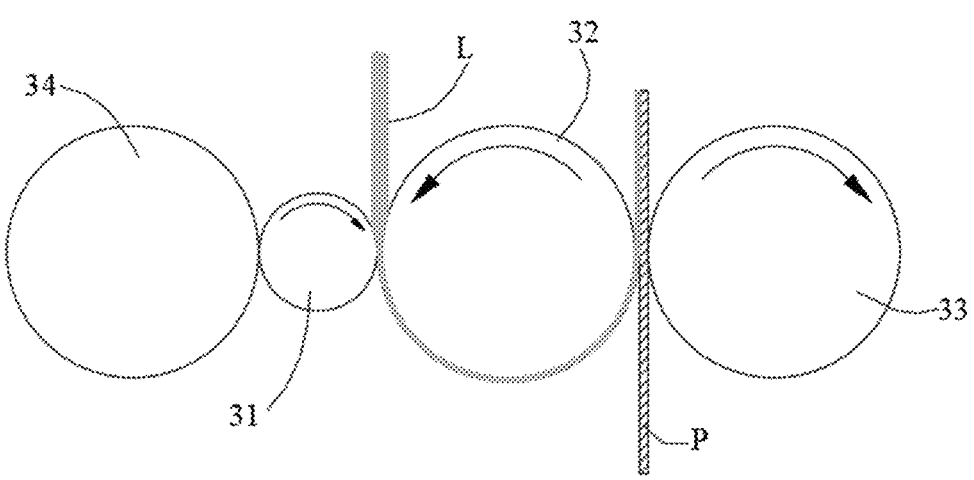
FIG. 3 is a schematic diagram of a device for supplementing an electrode plate with lithium in a lithiation process.
Figure 4:
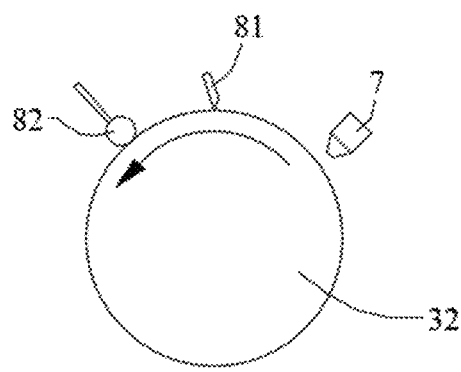
FIG. 4 is a schematic diagram of a lubricating mechanism and a cleaning mechanism in a device for supplementing an electrode plate with lithium.

Referring to FIG. 3, as the first laminating roller 32 rotates, the lithium strip L adhered to the roller surface of the first laminating roller 32 enters between the first laminating roller 32 and the second laminating roller 33. The first laminating roller 32 and the second laminating roller 33 roll the electrode plate P and the lithium strip L on the roller surface of the first laminating roller 32, to laminate the lithium strip L to the surface of the electrode plate P and implement lithiation for the electrode plate P.

There are two first coating mechanisms 6, each applying a coating layer on one of the two surfaces of the lithium strip L. The two first coating mechanisms 6 each accommodate a release agent, and surfaces of the release agents in the two first coating mechanisms 6 have different roughness. The two first coating mechanisms 6 apply the release agents on the two surfaces of the lithium strip L, so that the coating layer is formed on each of the two surfaces of the lithium strip L.

Different release agents are provided in the two first coating mechanisms 6, to make an adhesive strength between the lithium strip L and the first calendering roller 31 smaller than that between the lithium strip L and the first laminating roller 32. In this way, as the first calendering roller 31 and the first laminating roller 32 rotate, the lithium strip L is separated from the first calendering roller 31 and adhered to a roller surface of the first laminating roller 32.

When the first calendering roller 31 and the first laminating roller 32 roll the lithium strip L, the lithium strip L is actually broken into several sections, but is still adhered to the roller surface of the first laminating roller 32. After the lithium strip L is broken, a connection between the traction belt 42 and the lithium strip L fails, and the traction belt 42 automatically falls off without participating in the laminating process of the lithium strip L and the electrode plate P.

Under the rolling pressure of the first laminating roller 32 and the second laminating roller 33, the thinned lithium strip L is attached to the electrode plate P. Because the release agent can reduce the adhesive strength between the lithium strip L and the first laminating roller 32, the adhesive strength between the lithium strip L and the electrode plate P is greater than the adhesive strength between the lithium strip L and the first laminating roller 32. After the electrode plate P passes through between the first laminating roller 32 and the second laminating roller 33, the lithium strip L is peeled off from the first laminating roller 32 under the action of the electrode plate P.

In The device for supplementing an electrode plate with lithium of this application, the calendering process and the laminating process of the lithium strip L are integrated, thereby simplifying a lithiation process and reducing occupied space and production costs. The first coating mechanism 6 can apply the coating layer on the surface of the lithium strip L to lower difficulty of separating the lithium strip L from the first calendering roller 31 and difficulty of separating the lithium strip L from the first laminating roller 32, ensuring that the lithium strip L can be smoothly transferred to the surface of the electrode plate P.

If the first traction mechanism 4 is not provided, the lithium strip L needs to be manually drawn into between the first calendering roller 31 and the first laminating roller 32, and then drawn by the first calendering roller 31 and the first laminating roller 32 to travel. In this case, the first coating mechanism 6 cannot apply a coating layer to an initial section of the lithium strip L. As a result, the initial section of the lithium strip L is adhered to the surface of the first laminating roller 32 or the first calendering roller 31. In this case, the initial section of the lithium strip L cannot be transferred to the surface of the electrode plate P, resulting in waste of the lithium strip L, lowering flatness of the roller surfaces of the first laminating roller 32 and the first calendering roller 31, and affecting calendering for a subsequent section of the lithium strip L.

However, in this application, the first traction mechanism 4 can initially draw the lithium strip L to travel, so that the first coating mechanism 6 can apply the coating layer on the surface of the lithium strip L to prevent the lithium strip L from being adhered to the calendering roller 31 and the first laminating roller 32 and avoid waste of the lithium strip L.

The first coating mechanism 6 may adopt a coating method from transfer coating, extrusion coating, or screen printing coating. A spacing between a coating head of the first coating mechanism 6 and the lithium strip L is adjustable, so that a thickness of the coating layer on the lithium strip L can be controlled.

Referring to FIG. 1 and FIG. 2, the device for supplementing an electrode plate with lithium of this application further includes two pre-pressing rollers 12. In the traveling direction of the lithium strip L, the two pre-press rollers 12 precede the first coating mechanism 6. The lithium strip L passes through between the two pre-pressing rollers 12 first, and then passes through the first coating mechanism 6. The two pre-pressing rollers 12 can pre-calender the lithium strip L to improve thickness uniformity of the lithium strip L, thereby significantly improving an effect of applying the release agent on the surfaces of the lithium strip L, avoiding scratching the lithium strip L by the coating head of the first coating mechanism 6, and meeting a high requirement for the thickness uniformity of the lithium strip L in the coating process. The thickness uniformity of the lithium strip L is associated with manufacturing costs, and therefore lowering the requirement for the thickness uniformity of the lithium strip L can reduce incoming material costs of the lithium strip L.

Under the rolling action of the pre-pressing rollers 12, a compression rate of the lithium strip L is 10% to 20%, which means, after the lithium strip L passes through the pre-pressing rollers 12, a thickness of the lithium strip L is reduced by 10% to 20%. Because the compression rate of the lithium strip L is relatively small and the lithium strip L is not easy to adhere to the pre-pressing rollers 12, the two pre-pressing rollers 12 may precede the first coating mechanism 6.

In this application, a roller diameter of the first calendering roller 31 is less than a roller diameter of the first laminating roller 32. Through the joint use of large and small roller diameters, different-diameter rolling can be realized. Compared with equal-diameter rolling, the different-diameter rolling can reduce a rolling pressure for the lithium strip L, increase a contact area between the first laminating roller 32 and the lithium strip L, and improve a gripping effect of the lithium strip L and the first calendering roller 31 and a gripping effect of the lithium strip L and the first laminating roller 32, so that the lithium strip L is more easily adhered to the roller surface of the first laminating roller 32. In some embodiments, as the roller diameter of the first laminating roller 32 increases, a contact arc length between the lithium strip L and the first laminating roller 32 can be increased during the calendering for the lithium strip L, and the lithium strip L is not easy to slip at a high velocity.

In some embodiments, as the roller diameter of the first laminating roller 32 increases, during the laminating, a contact area and a contact arc length between the lithium strip L and the electrode plate P may be increased, thereby improving an adhesion effect between the lithium strip L and the electrode plate P.

A ratio of the roller diameter of the first calendering roller 31 to the roller diameter of the first laminating roller 32 is 0.5 to 0.99. The roller diameter of the first calendering roller 31 is 100 millimeters (mm) to 200 mm, the roller diameter of the first laminating roller 32 is 200 mm to 400 mm, and the roller diameter of the second laminating roller 33 is 200 mm to 400 mm.

During the calendering for the lithium strip L, a linear velocity of the first calendering roller 31 is less than a linear velocity of the first laminating roller 32. In this way, different-velocity rolling can be realized and the rolling pressure applied to the lithium strip L can be reduced.

Because the roller diameter of the first calendering roller 31 is smaller, the first calendering roller 31 is prone to deform during the calendering, reducing thickness uniformity of the calendering. Optionally, the roller pressing mechanism 3 further includes a first backup roller 34, where the first backup roller 34 is disposed opposite the first calendering roller 31 and located at a side of the first calendering roller 31 farther away from the first laminating roller 32. A roller diameter of the first backup roller 34 is greater than the roller diameter of the first calendering roller 31.

The first backup roller 34 and the first calendering roller 31 are in contact with each other and rotate relatively, which can reduce deformation of the first calendering roller 31 during long-term use, improve thickness uniformity during the calendering for the lithium strip L, and prolong service life of the device.

After the lithium strip L is laminated to the electrode plate P, residue lithium scraps and release agent are retained on the roller surface of the first laminating roller 32. If the residue lithium scraps and release agent are not removed in time, the calendering and laminating for the lithium strip L may be affected.

Figure 6:
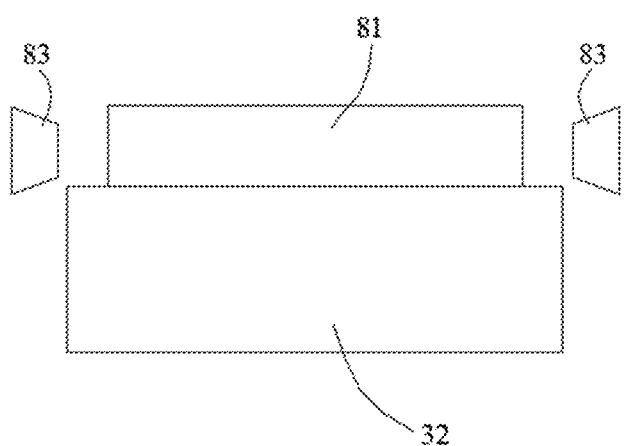
FIG. 6 is a schematic diagram of a cleaning mechanism in a device for supplementing an electrode plate with lithium.

Therefore, the device for supplementing an electrode plate with lithium of this application further includes a cleaning mechanism 8, where the cleaning mechanism 8 is configured to clean the roller surface of the first laminating roller 32. Specifically, the cleaning mechanism 8 includes a scraper 81, a cleaning member 82, and a dust suction member 83. The blade of the scraper 81 is in contact with the roller surface of the first laminating roller 32. As the first laminating roller 32 rotates, the scraper 81 scrapes off the residue lithium scraps and release agent from the roller surface of the first laminating roller 32. Referring to FIG. 6, the dust suction member 83 may be located on a side of the scraper 81 to suck and remove the scraped lithium scraps and release agent through the action of negative pressure. In the rotation direction of the first laminating roller 32, the cleaning member 82 is preceded by the scraper 81, and the cleaning member 82 is in contact with the roller surface of the first laminating roller 32 to further clean the roller surface of the first laminating roller 32. The cleaning member 82 may be a brush.

To enable the cleaning mechanism 8 to clean the roller surface of the first laminating roller 32 easily, the device for supplementing an electrode plate with lithium of this application further includes a lubricating mechanism 7, where the lubricating mechanism 7 is configured to apply a lubricating agent on the roller surface of the first laminating roller 32. The lubricating mechanism 7 and the cleaning mechanism 8 are arranged in the rotation direction of the first laminating roller 32. The lubricating agent can reduce difficulty of scraping off lithium crumbs and release agent by the scraper 81 and avoid scratching the roller surface of the first laminating roller 32. Under high-velocity production, the lubricating agent can also avoid safety hazards such as smoke and fire caused by dry friction between the scraper 81 and residual lithium on the surface of the first laminating roller 32.

During the calendering for the lithium strip L, the lithium strip L stretches in a width direction of the lithium strip L. However, no release agent is available in an extended zone of the lithium strip L, so that edges of the lithium strip L in the width direction are not easy to be transferred to the surface of the electrode plate P, and is directly adhered to the surface of the first laminating roller 32. Because adhesive strength between the remaining zone and the first laminating roller 32 is high, the first laminating roller 32 may be damaged by directly scraping off the residual lithium by the scraper 81.

Figure 5:
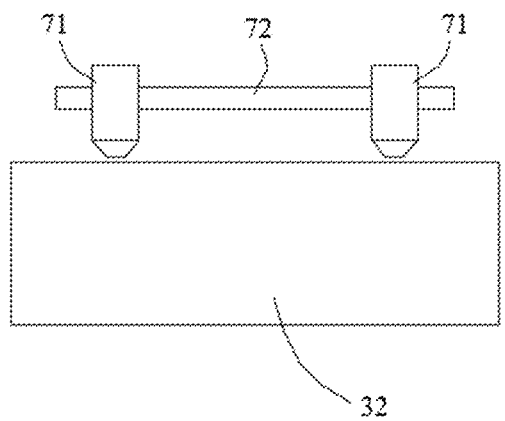
FIG. 5 is a schematic diagram of a lubricating mechanism in a device for supplementing an electrode plate with lithium.

Therefore, referring to FIG. 5, the lubricating mechanism 7 of this application includes two coating heads 71, and the two coating heads 71 are spaced apart in an axial direction of the first laminating roller 32. The two coating heads 71 are configured to apply the lubricating agent on the surface of the first laminating roller 32, and coating zones of the two coating heads 71 correspond to edge zones of the lithium strip L. In this case, the lubricating agent can reduce the difficulty of scraping off the lithium scraps and the release agent by the scraper 81, and avoid scratching the roller surface of the first laminating roller 32. A coated width of each coating head 7 is adjustable in a range of 1 mm to 10 mm.

The lubricating mechanism 7 further includes a guide member 72, where the two coating heads 71 are slidably disposed on the guide member 72 in a direction parallel to the axial direction of the first laminating roller 32. When width specifications of the lithium strip L are changed, only a spacing between the two coating heads 71 needs to be adjusted along the guide member 72. In other words, the lubricating mechanism 7 of this application has good versatility, adapting to different specifications of the lithium strip L.

The device for supplementing an electrode plate with lithium of this application is also provided with a cleaning mechanism 8 for cleaning the first calendering roller 31. Due to different release agents applied on the two surfaces of the lithium strip L, nearly no lithium scraps are retained on the first calendering roller 31; even if the lithium scraps remain, adhesive strength between the lithium scraps and the first calendering roller 31 is relatively small. Therefore, the scraper 81 and the cleaning member 82 of the cleaning mechanism 8 can clean the first calendering roller 31 well, and there is no need to provide the lubricating mechanism 7 for lubricating the first calendering roller 31.

Figure 7:
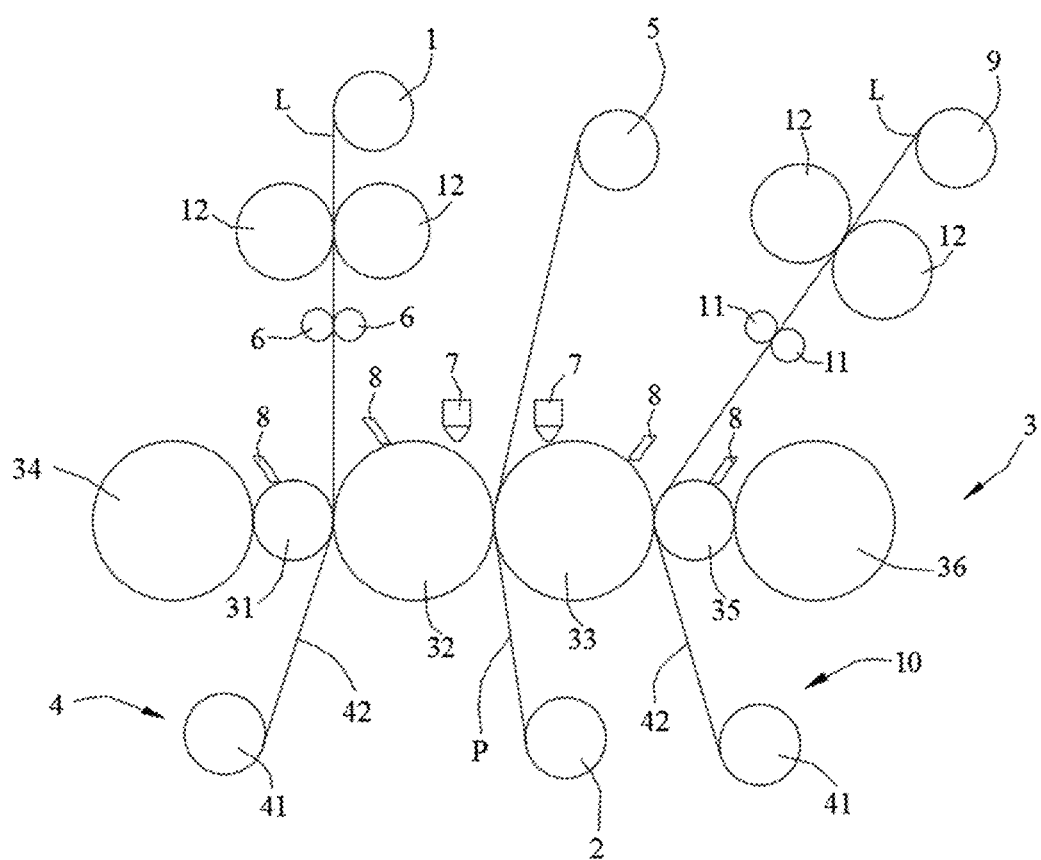
FIG. 7 is a schematic diagram of another embodiment of a device for supplementing an electrode plate with lithium.
Figure 8:
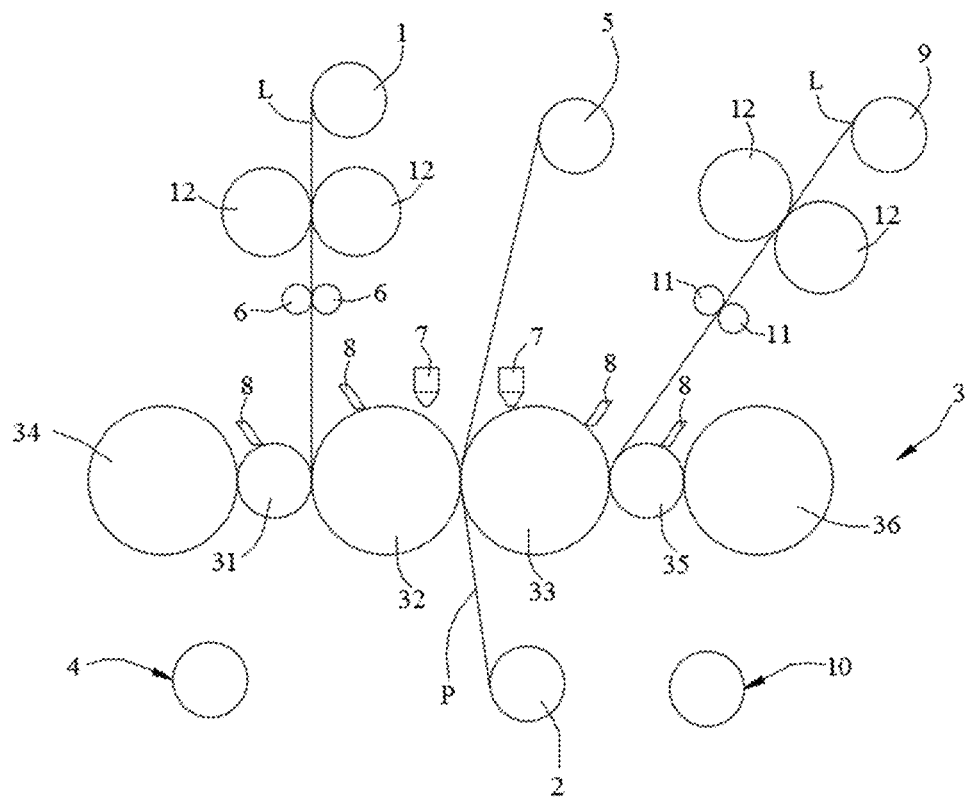
FIG. 8 is another schematic diagram of the device for supplementing an electrode plate with lithium in FIG. 7.
Figure 9:
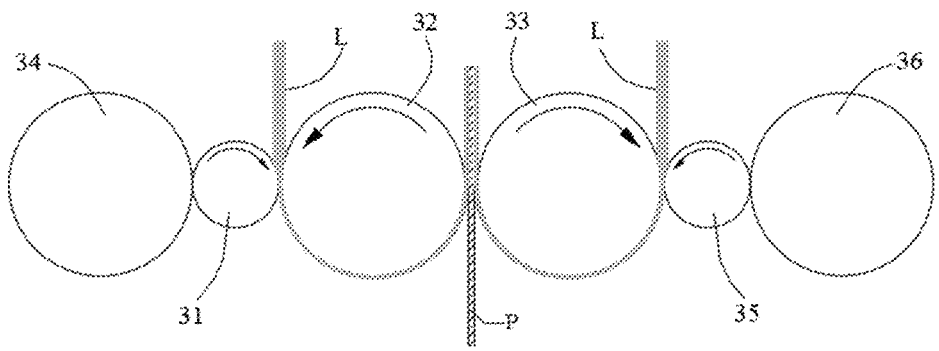
FIG. 9 is another schematic diagram of a device for supplementing an electrode plate with lithium in a lithiation process.

Referring to FIG. 7 to FIG. 9, the device for supplementing an electrode plate with lithium further includes a second lithium strip unwinding mechanism 9, a second traction mechanism 10, and a second coating mechanism 11.

The second lithium strip unwinding mechanism 9 is configured to dispose a lithium strip L. The second lithium strip unwinding mechanism 9 includes a lithium strip unwinding roller, and the lithium strip L can be connected to the lithium strip unwinding roller through winding.

The roller pressing mechanism 3 further includes a second calendering roller 35, where the second calendering roller 35 is disposed opposite the second laminating roller 33. The second traction mechanism 10 is configured to draw the lithium strip L provided by the second lithium strip unwinding mechanism 9 into between the second calendering roller 35 and the second laminating roller 33. In a traveling direction of the lithium strip L provided by the second lithium strip unwinding mechanism 9, the second coating mechanism 11 precedes the roller pressing mechanism 3, and the second coating mechanism 11 is configured to apply a coating layer on a surface of the lithium strip L provided by the second lithium strip unwinding mechanism 9.

The second traction mechanism 10 may be the same as the first traction mechanism 4. Specifically, the second traction mechanism 10 includes a traction roller 41 and a traction belt 42, and the traction belt 42 is connected to the traction roller 41.

The second calendering roller 35 and the second laminating roller 33 may be used for calendering the lithium strip L. When lithiation is required, the lithium strip L may be drawn into between the second calendering roller 35 and the second laminating roller 33. A roller pressure between the second calendering roller 35 and the second laminating roller 33 thins the lithium strip L.

There are two second coating mechanisms 11, each applying a coating layer on one of the two surfaces of the lithium strip L. The two second coating mechanisms 11 each accommodate a release agent, and surfaces of the release agents in the two second coating mechanisms 11 have different roughness. The two second coating mechanisms 11 apply the release agents on the two surfaces of the lithium strip L, so that the coating layer is formed on each of the two surfaces of the lithium strip L.

Different release agents are provided in the two second coating mechanisms 11, making adhesive strength between the lithium strip L and the second calendering roller 35 smaller than that between the lithium strip L and the second laminating roller 33. Therefore, as the second calendering roller 35 and the second laminating roller 33 rotate, the lithium strip L is separated from the second calendering roller 35 and adhered to a roller surface of the second laminating roller 33.

The lithium strip L adhered to the first laminating roller 32 and the lithium strip L adhered to the second laminating roller 33 are respectively laminated to the two surfaces of the electrode plate P, to intercalate lithium on the two surfaces of the electrode plate P.

The second traction mechanism 10 can initially draw the lithium strip L to travel, so that the second coating mechanism 11 can apply the coating layer on the surface of the lithium strip L to prevent the lithium strip L from adhering to the second calendering roller 35 and the second laminating roller 33 and avoid waste of the lithium strip L.

The second coating mechanism 11 and the first coating mechanism 6 may be the same.

In The device for supplementing an electrode plate with lithium of this application, two pre-pressing rollers 12 may be further provided and precede the second coating mechanism 11 to roll the lithium strip L provided by the second lithium strip unwinding mechanism 9, so as to increase the thickness uniformity of the lithium strip L.

A roller diameter of the second calendering roller 35 is less than a roller diameter of the second laminating roller 33, thereby realizing different-diameter rolling and reducing a rolling pressure applied to the lithium strip L. During the calendering for the lithium strip L, a linear velocity of the second calendering roller 35 is lower than a linear velocity of the second laminating roller 33, to implement different-velocity rolling and reduce the rolling pressure applied to the lithium strip L.

The roller pressing mechanism 3 further includes a second backup roller 36, where the second backup roller 36 is disposed opposite the second calendering roller 35 and located at a side of the second calendering roller 35 farther away from the second laminating roller 33 A roller diameter of the second backup roller 36 is greater than a roller diameter of the second calendering roller 35. The second backup roller 36 can reduce deformation of the second calendering roller 35 during long-term use, improving thickness uniformity during calendering for the lithium strip L, and prolonging service life of the device.

The device for supplementing an electrode plate with lithium of this application may further provide a lubricating mechanism 7 configured to lubricate the second laminating roller 33 and a cleaning mechanism 8 configured to clean the second laminating roller 33. The lubricating mechanism 7 configured to lubricate the second laminating roller 33 is the same as the lubricating mechanism 7 configured to lubricate the first laminating roller 32, and the cleaning mechanism 8 configured to clean the second laminating roller 33 is the same as the cleaning mechanism 8 configured to clean the first laminating roller 32.

The application further provides a method for supplementing an electrode plate with lithium. The method for supplementing an electrode plate with lithium includes:

disposing a lithium strip L to a first lithium strip unwinding mechanism 1, and disposing an electrode plate P to an electrode plate unwinding mechanism 2;

connecting an end of the lithium strip L to a first traction mechanism 4, where the first traction mechanism 4 draws the lithium strip L to travel and pass through a first coating mechanism 6, and the first coating mechanism 6 applies a coating layer on a surface of the lithium strip L;

drawing the lithium strip L coated with the coating layer into between a first calendering roller 31 and a first laminating roller 32 under the traction of the first traction mechanism 4, where the first calendering roller 31 and the first laminating roller 32 rotate and thin the lithium strip L, and the lithium strip L is adhered to a roller surface of the first laminating roller 32 and separated from the first traction mechanism 4; and drawing the electrode plate P to pass through between the first laminating roller 32 and the second laminating roller 33 and connect to an electrode plate winding mechanism 5, where the first laminating roller 32 and the second laminating roller 33 roll the electrode plate P and the lithium strip L on the roller surface of the first laminating roller 32, to laminate the lithium strip L to the surface of the electrode plate P.

In the method for supplementing an electrode plate with lithium of this application, a calendering process and a laminating process of the lithium strip L are integrated, thereby simplifying a lithiation process and reducing occupied space and production costs. The first coating mechanism 6 can apply the coating layer on the surface of the lithium strip L to lower difficulty of separating the lithium strip L from the first calendering roller 31 and difficulty of separating the lithium strip L from the first laminating roller 32, ensuring that the lithium strip L can be smoothly transferred to the surface of the electrode plate P.

The first traction mechanism 4 can initially draw the lithium strip L to travel, so that the first coating mechanism 6 can apply the coating layer on the surface of the lithium strip L to prevent the lithium strip L from being adhered to the first calendering roller 31 and the first laminating roller 32 and avoid waste of the lithium strip L.

In the method for supplementing an electrode plate with lithium of this application, a linear velocity of the first calendering roller 31 is lower than a linear velocity of the first laminating roller 32, so that different-velocity rolling can be implemented, to decrease a rolling pressure applied to the lithium strip L, reduce energy consumption, lower payloads of the device, and prolong service life of the device.

Although this application has been described with reference to the preferred embodiments, various modifications can be made to this application without departing from the scope of this application and the components therein can be replaced with equivalents. In particular, as long as there is no structural conflict, the various technical features mentioned in the embodiments can be combined in any manner. This application is not limited to the specific embodiments disclosed in this specification, but includes all technical solutions falling within the scope of the claims.

What is claimed is:

1. A device for supplementing an electrode plate with lithium, comprising a first lithium strip unwinding mechanism, an electrode plate unwinding mechanism, a roller pressing mechanism, a first traction mechanism, an electrode plate winding mechanism, at least one first coating mechanism, a lubricating mechanism, and a cleaning mechanism, wherein
the first lithium strip unwinding mechanism is configured to dispose a lithium strip, and the electrode plate unwinding mechanism is configured to dispose an electrode plate;
the roller pressing mechanism comprises a first calendering roller, a first laminating roller, and a second laminating roller;
the first traction mechanism is configured to draw the lithium strip into between the first calendering roller and the first laminating roller, and the electrode plate winding mechanism is configured to wind up the electrode plate and draw the electrode plate to pass through between the first laminating roller and the second laminating roller;
in a traveling direction of the lithium strip, the at least one first coating mechanism precedes the roller pressing mechanism and is configured to apply a coating layer on a surface of the lithium strip;
the first traction mechanism comprises a traction roller and a traction belt, one end of the traction belt is connected to the traction roller, and the other end of the traction belt is connected to the lithium strip;
in the traveling direction of the lithium strip, the traction roller is preceded by the first calendering roller; and the lubricating mechanism is configured to apply a lubricating agent on a roller surface of the first laminating roller,
the cleaning mechanism is configured to clean the roller surface of the first laminating roller and comprises a scraper and a dust suction member, the scraper is in contact with the roller surface of the first laminating roller and configured to scrape off residue lithium scraps and release agent from the roller surface of the first laminating roller, the dust suction member is located on a side of the scraper and configured to suck and remove the scraped lithium scraps and release agent through negative pressure,
wherein the lubricating mechanism comprises a guide member and two coating heads, the two coating heads are spaced apart in an axial direction of the first laminating roller, and the two coating heads are slidably disposed on the guide member in a direction parallel to the axial direction of the first laminating roller.

2. The device for supplementing an electrode plate with lithium according to claim 1, wherein
the lubricating mechanism and the cleaning mechanism are arranged on an outer peripheral side of the first laminating roller, and the lubricating mechanism and the cleaning mechanism are arranged in a rotation direction of the first laminating roller.

3. The device for supplementing an electrode plate with lithium according to claim 1, wherein the cleaning mechanism further comprises a cleaning member, in a rotation direction of the first laminating roller, the cleaning member is preceded by the scraper, the cleaning member is in contact with the roller surface of the first laminating roller to further clean the roller surface of the first laminating roller.

4. The device for supplementing an electrode plate with lithium according to claim 1, wherein a roller diameter of the first calendering roller is less than a roller diameter of the first laminating roller.

5. The device for supplementing an electrode plate with lithium according to claim 4, wherein a ratio of the roller diameter of the first calendering roller to the roller diameter of the first laminating roller is 0.5 to 0.99.

6. The device for supplementing an electrode plate with lithium according to claim 1, wherein
the roller pressing mechanism further comprises a first backup roller, wherein the first backup roller is disposed opposite the first calendering roller and located at a side of the first calendering roller farther away from the first laminating roller; and
a roller diameter of the first backup roller is greater than the roller diameter of the first calendering roller.

7. The device for supplementing an electrode plate with lithium according to claim 1, wherein
the at least one first coating mechanism comprises two first coating mechanisms, and each apply a coating layer on one of two surfaces of the lithium strip; and
the two first coating mechanisms each accommodate a release agent, and surfaces of the release agents in the two first coating mechanisms have different roughness.

8. The device for supplementing an electrode plate with lithium according to claim 1, wherein
the device for supplementing an electrode plate with lithium further comprises a second lithium strip unwinding mechanism, a second traction mechanism, and a second coating mechanism, wherein
the second lithium strip unwinding mechanism is configured to dispose a lithium strip;

the roller pressing mechanism further comprises a second calendering roller, wherein the second calendering roller is disposed opposite the second laminating roller;

the second traction mechanism is configured to draw the lithium strip provided by the second lithium strip unwinding mechanism into between the second calendering roller and the second laminating roller; and in a traveling direction of the lithium strip provided by the second lithium strip unwinding mechanism, the second coating mechanism precedes the roller pressing mechanism, and the second coating mechanism is configured to apply a coating layer on a surface of the lithium strip provided by the second lithium strip unwinding mechanism.

9. The device for supplementing an electrode plate with lithium according to claim 8, wherein a roller diameter of the second calendering roller is less than a roller diameter of the second laminating roller.

10. The device for supplementing an electrode plate with lithium according to claim 8, wherein the device for supplementing an electrode plate with lithium further comprises at least one group of pre-pressing rollers, wherein each group of pre-pressing rollers comprises two pre-pressing rollers; and in the traveling direction of the lithium strip, the two pre-pressing rollers in the at least one group of pre-pressing rollers are located outside two surfaces of the lithium strip, and the two pre-pressing rollers in the at least one group of pre-pressing rollers precede the first coating mechanism.

11. The device for supplementing an electrode plate with lithium according to claim 10, wherein the device for supplementing an electrode plate with lithium comprises two groups of pre-pressing rollers; and in the traveling direction of the lithium strip, two pre-pressing rollers in each group of pre-pressing rollers are located outside two surfaces of the corresponding lithium strip, and two pre-pressing rollers in one group of pre-pressing rollers precede the first coating mechanism, and two pre-pressing rollers in the other group of pre-pressing rollers precede the second coating mechanism.

12. A method for supplementing an electrode plate with lithium, comprising disposing a lithium strip to a first lithium strip unwinding mechanism, and disposing an electrode plate to an electrode plate unwinding mechanism;

connecting an end of the lithium strip to a first traction mechanism, wherein the first traction mechanism draws the lithium strip to travel and pass through a first coating mechanism, and the first coating mechanism applies a coating layer on a surface of the lithium strip;

drawing the lithium strip coated with the coating layer into between a first calendering roller and a first laminating roller under the traction of the first traction mechanism, wherein the first calendering roller and the first laminating roller rotate and thin the lithium strip, and the lithium strip is adhered to a roller surface of the first laminating roller and separated from the first traction mechanism;

drawing the electrode plate to pass through between the first laminating roller and a second laminating roller and connect to an electrode plate winding mechanism, applying a lubricating agent on a roller surface of the first laminating roller by a lubricating mechanism, cleaning the roller surface of the first laminating to remove residue lithium scraps and release agent from the roller surface of the first laminating roller by a cleaning mechanism, wherein the first laminating roller and the second laminating roller roll the electrode plate and the lithium strip on the roller surface of the first laminating roller, to laminate the lithium strip to the surface of the electrode plate;

the first traction mechanism comprises a traction roller and a traction belt, one end of the traction belt is connected to the traction roller, and the other end of the traction belt is connected to the lithium strip;

in the traveling direction of the lithium strip, the traction roller is preceded by the first calendering roller; and the lubricating mechanism is arranged on an outer peripheral side of the first laminating roller and in a rotation direction of the first laminating roller and configured to apply a lubricating agent on a roller surface of the first laminating roller, and the lubricating mechanism comprises two coating heads and a guide member, the two coating heads are slidably disposed on the guide member in a direction parallel to an axial direction of the first laminating roller and are spaced apart in an axial direction of the first laminating roller.

13. The method for supplementing an electrode plate with lithium according to claim 12, wherein a linear velocity of the first calendering roller is less than a linear velocity of the first laminating roller.

14. A device for supplementing an electrode plate with lithium, the device comprising a first lithium strip unwinding mechanism, an electrode plate unwinding mechanism, a roller pressing mechanism, a first traction mechanism, an electrode plate winding mechanism, a first coating mechanism, a lubricating mechanism, wherein the first lithium strip unwinding mechanism is configured to dispose a lithium strip, and the electrode plate unwinding mechanism is configured to dispose an electrode plate;

the roller pressing mechanism comprises a first calendering roller, a first laminating roller, and a second laminating roller;

the first traction mechanism is configured to draw the lithium strip into between the first calendering roller and the first laminating roller, and the electrode plate winding mechanism is configured to wind up the electrode plate and draw the electrode plate to pass through between the first laminating roller and the second laminating roller;

in a traveling direction of the lithium strip, the first coating mechanism precedes the roller pressing mechanism, and the first coating mechanism is configured to apply a coating layer on a surface of the lithium strip;

the first traction mechanism comprises a traction roller and a traction belt, one end of the traction belt is connected to the traction roller, and the other end of the traction belt is connected to the lithium strip, and in the traveling direction of the lithium strip, the traction roller is preceded by the first calendering roller;

the lubricating mechanism is arranged on an outer peripheral side of the first laminating roller and in a rotation direction of the first laminating roller and configured to apply a lubricating agent on a roller surface of the first laminating roller, and the lubricating mechanism comprises two coating heads and a guide member, the two coating heads are slidably disposed on the guide member in a direction parallel to an axial direction of the first laminating roller and are spaced apart in an axial direction of the first laminating roller.

15. The device for supplementing an electrode plate with lithium according to claim 14, further comprising a cleaning mechanism, wherein
the cleaning mechanism is arranged on an outer peripheral side of the first laminating roller and in a rotation direction of the first laminating roller and configured to clean the roller surface of the first laminating roller.

16. The device for supplementing an electrode plate with lithium according to claim 14, wherein
the roller pressing mechanism further comprises a first backup roller, wherein the first backup roller is disposed opposite the first calendering roller and located at a side of the first calendering roller farther away from the first laminating roller; and
a roller diameter of the first backup roller is greater than the roller diameter of the first calendering roller.

17. The device for supplementing an electrode plate with lithium according to claim 14, wherein
there are two first coating mechanisms, and each apply a coating layer on one of two surfaces of the lithium strip; and
the two first coating mechanisms each accommodate a release agent, and surfaces of the release agents in the two first coating mechanisms have different roughness.

18. The device for supplementing an electrode plate with lithium according to claim 14, wherein a roller diameter of the first calendering roller is less than a roller diameter of the first laminating roller.

19. The device for supplementing an electrode plate with lithium according to claim 18, wherein a ratio of the roller diameter of the first calendering roller to the roller diameter of the first laminating roller is 0.5 to 0.99.

* * * * *